United States Patent [19]

Axer et al.

[11] 4,086,313

[45] Apr. 25, 1978

[54] METHOD OF MAKING PRESSED BOARD

[75] Inventors: Heinrich Axer, Nettetal; Gerd Roth, Kevelaer, both of Germany

[73] Assignee: G. Siempelkamp & Co., Krefeld, Germany

[21] Appl. No.: 532,375

[22] Filed: Dec. 13, 1974

Related U.S. Application Data

[62] Division of Ser. No. 383,730, Jul. 30, 1973, Pat. No. 3,904,336.

[30] Foreign Application Priority Data

Aug. 1, 1972 Germany ............................ 2237755
Nov. 14, 1972 Germany ............................ 2255712

[51] Int. Cl.[2] ......................... B29D 7/14; B29G 7/00; B29J 5/00

[52] U.S. Cl. ...................................... 264/70; 264/121; 264/123; 264/126; 264/165; 264/257

[58] Field of Search ............... 264/108, 109, 119, 112, 264/120–122, 257, 261, 258, 91, 69–72, 123, 165, 126; 425/456, 83, 323, 115, 371; 156/62.2, 73.6; 19/155

[56] References Cited

U.S. PATENT DOCUMENTS

| | | | |
|---|---|---|---|
| 2,618,816 | 11/1952 | Joa | 264/121 |
| 2,646,381 | 7/1953 | Duvall | 264/121 |
| 2,759,222 | 8/1956 | Bowers | 26 4/70 |
| 2,926,719 | 3/1960 | Matthews | 264/120 |
| 2,968,068 | 1/1961 | Brown | 264/72 |
| 3,012,923 | 12/1961 | Slayter | 156/62.2 |
| 3,044,922 | 7/1962 | Kappel | 264/258 |
| 3,058,169 | 10/1962 | Joa | 264/121 |
| 3,115,431 | 12/1963 | Stokes et al. | 264/108 |
| 3,177,275 | 4/1965 | Brenner | 264/121 |
| 3,356,280 | 12/1967 | Cole | 264/121 |
| 3,518,157 | 6/1970 | Terry et al. | 264/120 |
| 3,863,908 | 2/1975 | Carpentier | 264/109 |

*Primary Examiner*—Willard E. Hoag
*Attorney, Agent, or Firm*—Karl F. Ross

[57] ABSTRACT

In manufacturing pressed boards, a flowable mixture of thermosetting resinous material and filler is blown through one or more nozzles into a converging throat formed by a pair of relatively inclined perforated conveyor bands in which the mixture is compacted into a continuous, coherent but preferably still pliable web by the application of heat to preset the resinous material thereof. The web may be immediately converted into a rigid board by being led, without intermediate cooling, into a continuously working press for final condensation of the resin; on the way to that press it may be subjected to a finishing operation, as by adhesion of preheated strips of paper or other coverings to its still tacky surfaces.

5 Claims, 9 Drawing Figures

METHOD OF MAKING PRESSED BOARD

CROSS-REFERENCE TO RELATED APPLICATION

This is a division of application Ser. No. 383,730, filed 30 July 1973, now U.S. Pat. No. 3,904,336.

FIELD OF THE INVENTION

Our present invention relates to an apparatus for making pressed board of the type in which a binder of thermosetting resinous material is blended with a filler and the resulting mixture is then compacted into sheet or plate form, the resin being subsequently cured to convert the compacted body into a solid board. Depending on the nature of the filler, which could consist of wood chips and/or cellulosic or other fibers, these pressed boards are generally known as chipboards or fiberboards.

BACKGROUND OF THE INVENTION

In the conventional manufacture of such pressed boards, the mixture of binder and filler is compacted in the cold state and later subjected to heat and pressure for setting the resin. Prior to such setting, the compacted body has only limited mechanical strength and is, therefore, difficult to handle. Problems exist, accordingly, in transporting such sheets or plates to a flatpress (e.g. one of the multilevel type) for final shaping and setting.

OBJECTS OF THE INVENTION

The object of our present invention, therefore, is to provide a method of converting the aforedescribed mixture into an intermediate product of manufacture which is easy to handle and from which pressed board can be made by conventional treatment.

SUMMARY OF THE INVENTION

We have found, in accordance with our present invention, that an easily manipulable and coherent intermediate product in the manufacture of pressed board can be produced by blowing a flowable mixture of thermosetting resinous material and filler through one or more nozzles into a converging throat defined by a pair of perforated, endless conveyor bands with relatively inclined confronting surfaces, the perforations serving for the escape of a carrier fluid (usually air) which entrains the components of the mixture. The flowable mixture entering the throat is subjected to the action of heating means for at least partly setting the resinous binder thereof during compaction of the mixture between the conveyor bands into a continuous and coherent web. The term "setting" (or "presetting"), as herein used, encompasses both condensation and polymerization.

The heating of the mixture in the converging throat is carried out, pursuant to our present invention, by preheating the carrier fluid ahead of the nozzle or nozzles through which the mixture is entrained into the converging throat.

Depending on the degree of heating, which in general should be roughly commensurate with the degree of compression the mixture undergoes between the conveyor bands, the setting of the resinous material may be carried to only partial or substantially full completion within the compacting stage. In either case, the mass issuing from that stage will have the shape of a coherent, continuous web which can then be further consolidated, with or without additional heating, in a continuously or intermittently operating press.

Final pressing and setting is carried out in a continuously operating stage adjoining the compacting stage so as to receive the web issuing from the narrow end of the throat thereof. The transition from the compacting stage to the final stage should take place without significant reduction in web temperature in order to make the setting process chemically continuous. For this purpose, if the two compression stages are separated by a further treatment stage, the latter should be provided with supplemental heating means for at least maintaining the web temperature at the value it has on exiting from the throat. If the intermediate stage is a finishing stage, designed to apply decorative or protective coverings such as paper strips, veneers or the like to either or each of the still tacky web surfaces for adhesion thereto, the desired maintenance of or increase in temperature level is advantageously accomplished by preheating the covering material prior to its application to the web.

In cases where the filler consists predominantly of narrow particles, such as flat chips or short filaments, the setting process may not be uniform if these particles are randomly distributed within the resin matrix or binder. We therefore prefer to subject the particles upon their entrance into the throat to an orienting force which makes them lie substantially transversely to the direction of web growth or motion. This orientation may be accomplished with the aid of vibrators that agitate the oncoming particles, coated with resinous material, at the point where they impinge upon the mass already present within the throat.

BRIEF DESCRIPTION OF THE DRAWING

The above and other features will now be described with reference to the accompanying drawing in which.

SPECIFIC DESCRIPTION

Figure 1:
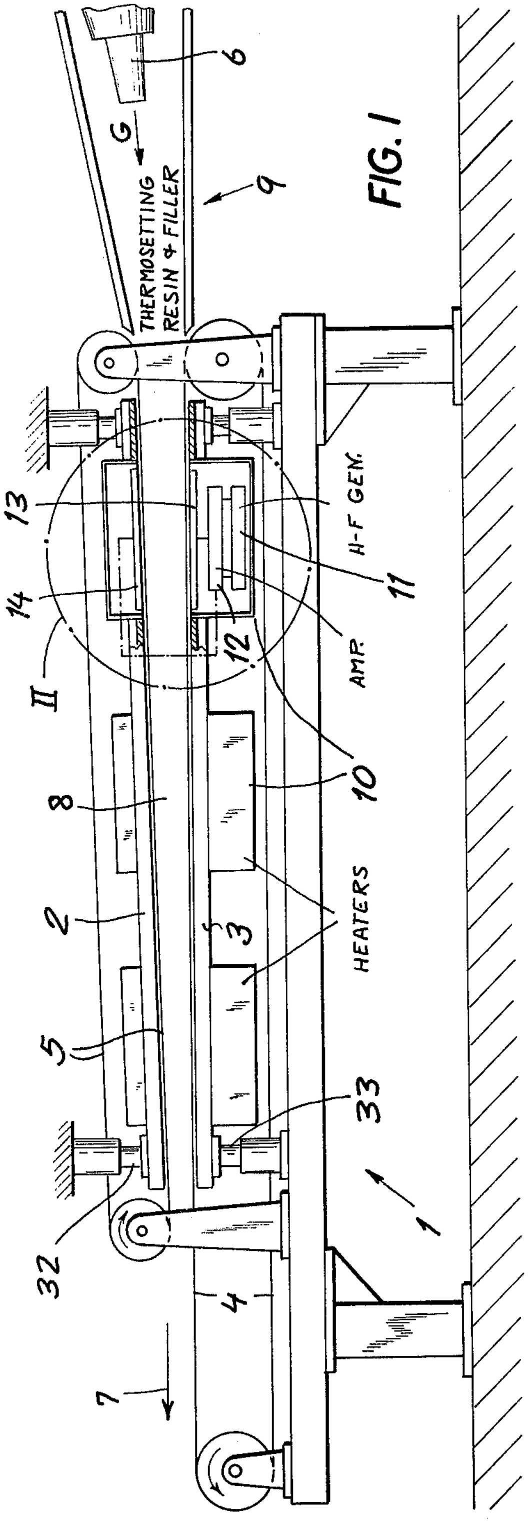
FIG. 1 is a side-elevational view of a compacting stage forming part of an apparatus according to our invention.
Figure 2:
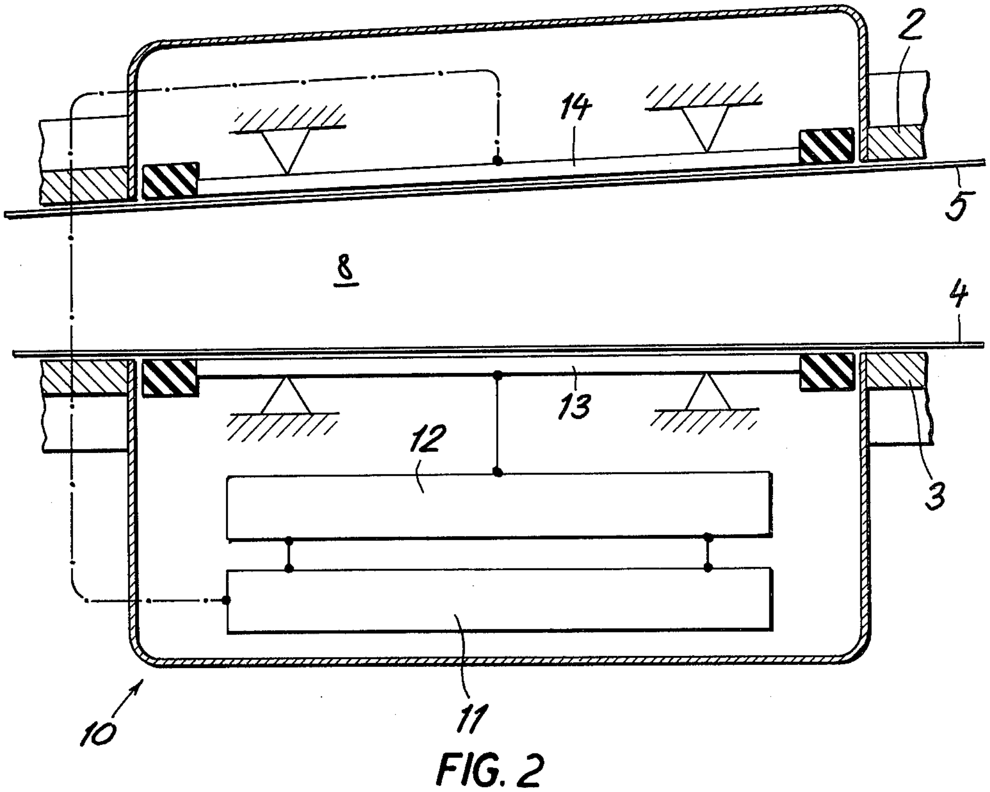
FIG. 2 is an enlarged view of the detail II of FIG. 1.

In FIGS. 1 and 2 we have shown a compacting stage 1 for a flowable mixture of resinous binder and filler, such as wood chips admixed with two interacting components of a thermosetting resin (e.g. phenolformaldehyde) along with a catalyst therefor. The mixture is supplied by one or more nozzles 6 through which it is introduced with the aid of a carrier gas represented diagrammatically by an arrow G. Nozzle 6 opens into a narrowing inlet guide 9, formed from stationary plates, which terminates at the broad end of a converging throat 8 defined by an upper compression plate 2, a lower compression plate 3 and two endless screen-type conveyor bands 4, 5 respectively enveloping the plates 3 and 2. The plates 2 and 3 are adjustably supported on respective plungers 32, 33 which may be hydraulically actuated to vary the effective separation of the plates and of the conveyor bands, i.e. the width of the throat 8. Upon the escape of the entraining carrier gas through the interstices of conveyor bands 4 and 5, the mixture of binder and filler leaves the throat 8 at its narrow end in the direction of arrow 7 as a continuous, coherent web illustrated at 17 in FIG. 5.

In order to impart the necessary coherency to the web, the mixture compacted in throat 8 is subjected to the action of heating means 10, here shown as three mutually insulated heating units inserted in the compression plates 2 and 3 along the conveyor path. As particularly illustrated for the right-hand unit, each of these units comprises a high-frequency generator 11 working into an amplifier 12 whose output energizes a pair of electrodes 13, 14 having confronting sides in line with corresponding surfaces of the compression plates. If individual adjustment of the heating effect at different locations is not required, the plates 2, 3 may themselves be designed as heating electrodes.

Figure 3:
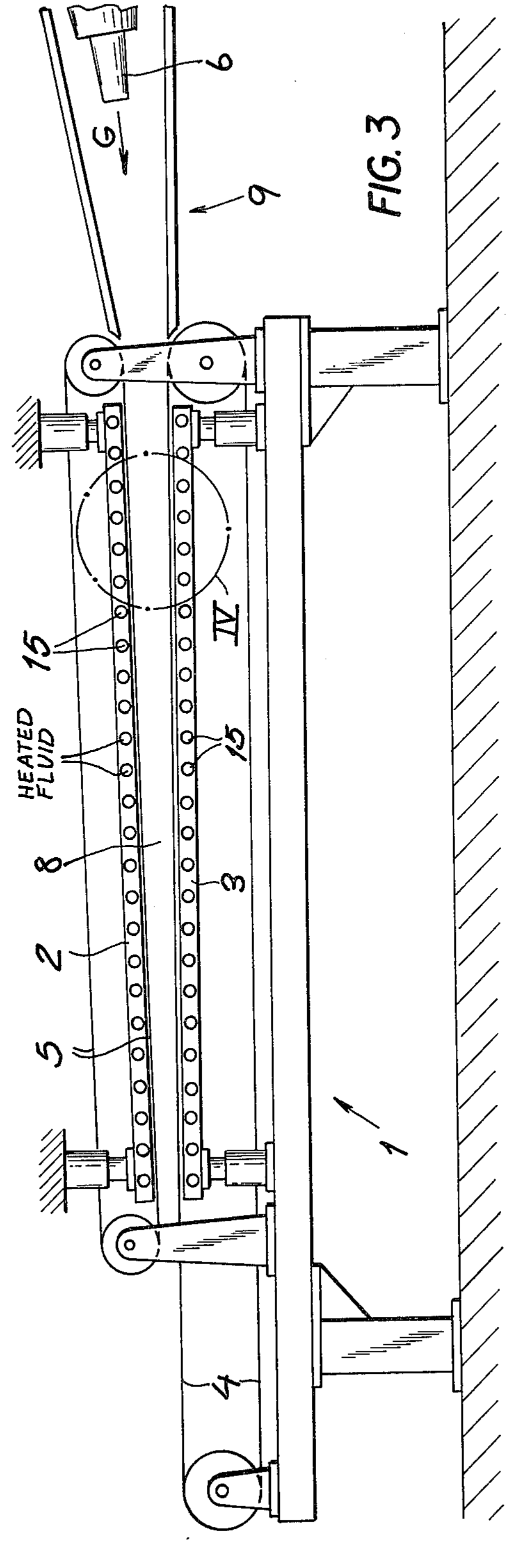
FIG. 3 is a view similar to that of FIG. 1, illustrating a modification.
Figure 4:
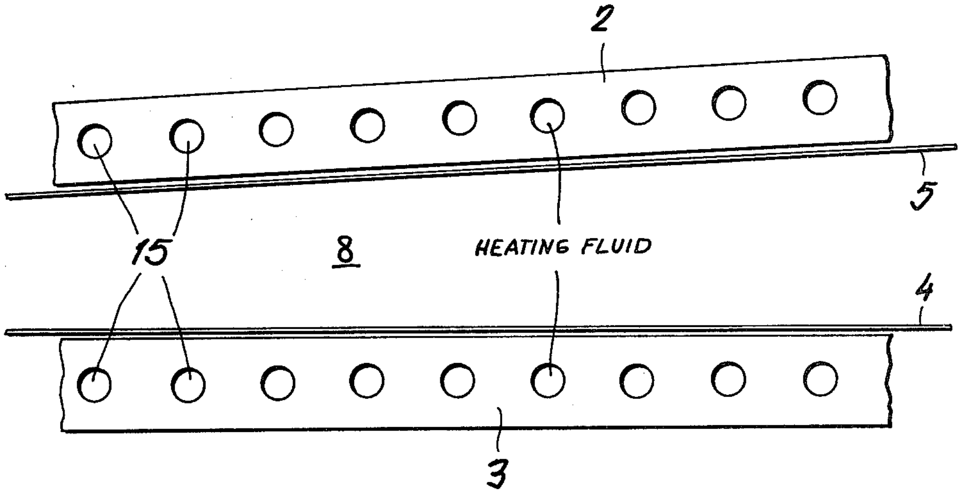
FIG. 4 is an enlarged view of the detail IV of FIG. 3.

As shown in FIGS. 3 and 4, the heaters 10 could be replaced by channels 15 in compression plates 2 and 3, these channels being externally interconnected by non-illustrated manifolds for the circulation of a heating fluid therethrough.

Figure 7:
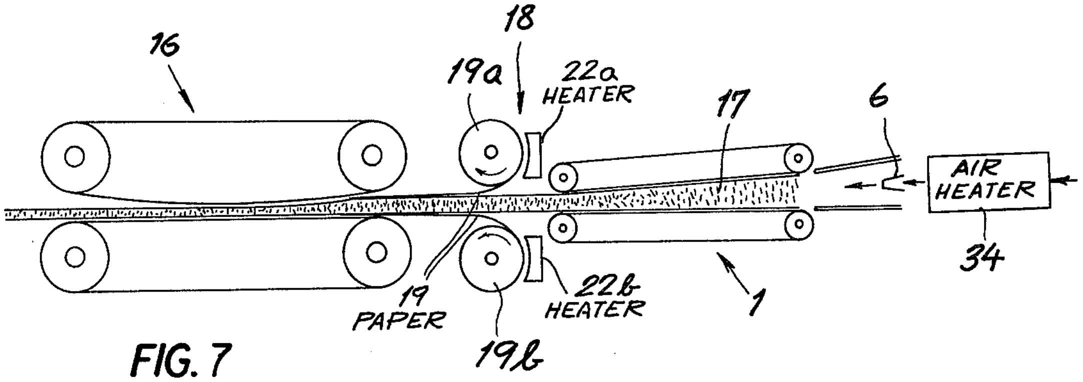
FIG. 7 is a simplified overall view, drawn to a reduced scale, of a system as shown in FIG. 5, with incorporation of an intermediate finishing stage.

As indicated in FIG. 7, the carrier gas (e.g. air) blown through nozzle 6 may be preheated at 34 to supply all or part of the heat needed for at least presetting the resinous material of the injected mixture.

Figure 5:
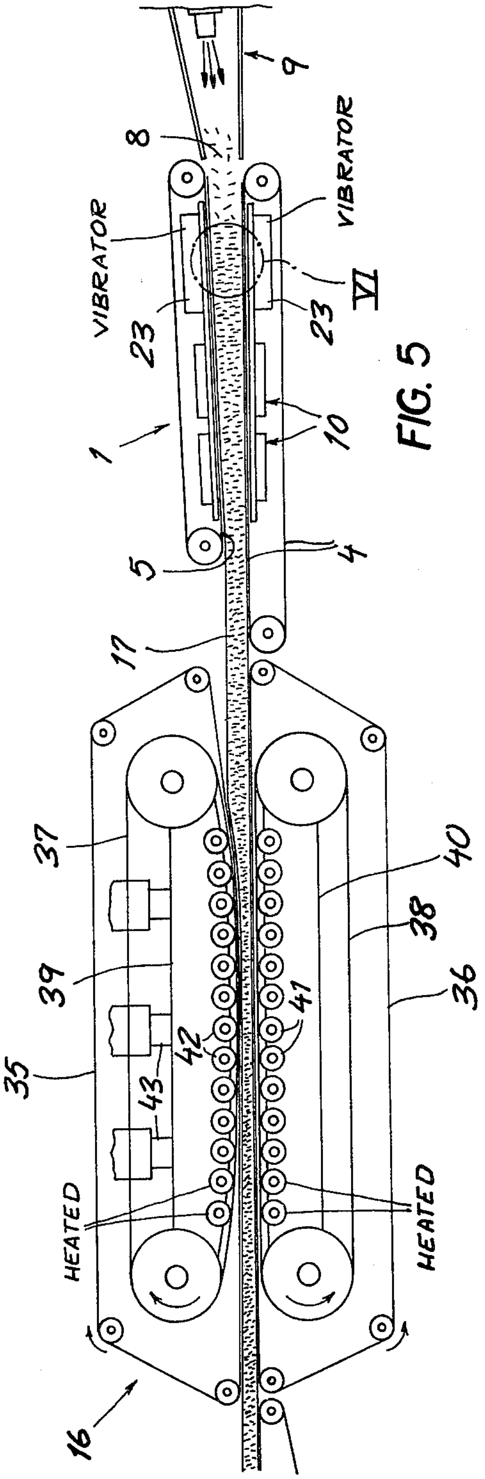
FIG. 5 is a side-elevational view of an apparatus including a final compression stage besides a preliminary compacting stage of the type shown in FIG. 1.

In FIG. 5 we have shown the compaction stage 1 immediately followed by a final compression stage 16, comprising a pair of endless conveyors 35, 36, which in this case may be continuous steel bands or the like, entrained in the direction of the arrows by belts 37, 38 supported on respective pairs of beams 39, 40 (only one beam of each pair being visible). The lower beams 40 carry between them a set of rollers 41 arrayed in a horizontal plane to guide the upper run of band 36 and belt 38 which form a bed for the web 17 issuing from stage 1. The upper beams 39 similarly carry rollers 42 which are arrayed along a curved surface to guide the lower run of belt 37 and band 35 along a path which approaches the bed surface so as to compress the oncoming web 17 to a reduced thickness. Rollers 41 and 42 may also be heated, as indicated on the drawing, e.g. by the passage of a hot fluid therethrough. The final thickness of the compressed web may be adjusted with the aid of plungers 43, which again may be hydraulically actuated, from which the upper beam pair 39 is suspended.

Figure 6:
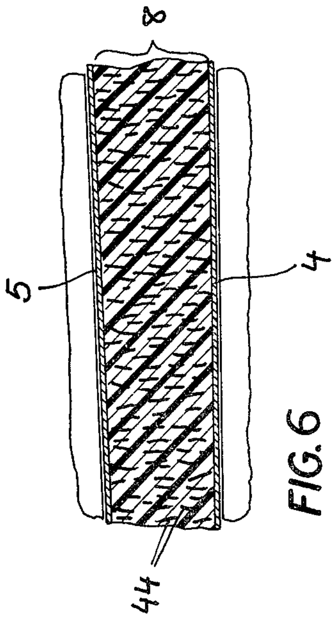
FIG. 6 is an enlarged view of the detail VI of FIG. 5.

FIG. 5 also shows vibrators 23 at the entrance end of throat 8, i.e. in the position of the first heater 10 of FIG. 1, designed to promote a transverse orientation of resin-coated particles 44 (see FIG. 6) blown into the throat 8.

In FIG. 7 we have illustrated a finishing stage 18 disposed between the two compression stages 1 and 16. This finishing stage comprises a pair of rollers **19*a*, 19*b* from which strips 19 of paper or other suitable covering material are continuously deposited on the tacky upper and lower surfaces of web 17 with the aid of nonillustrated guide and pressure rollers. For reasons outlined above, the paper coming from rollers 19*a* and 19*b* is preheated by radiators 22*a*, 22*b* so as to maintain the temperature of the web 17 substantially constant or even increasing as the web passes from stage 1 to stage 16**.

Figure 8:
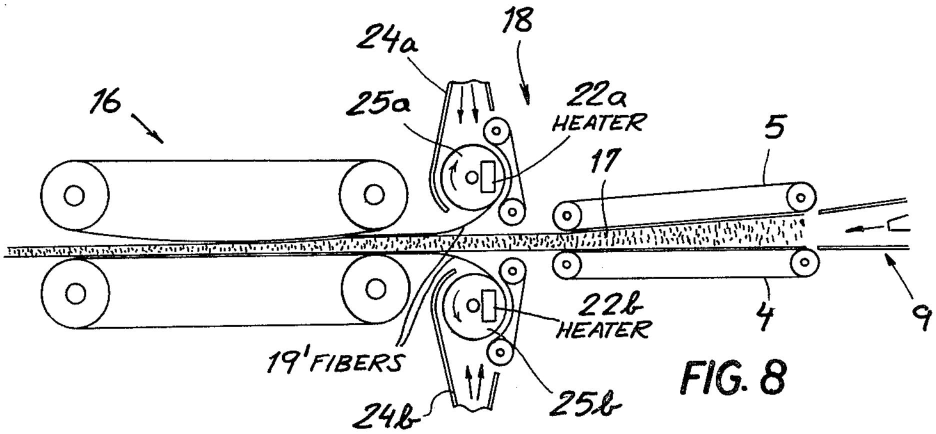
FIG. 8 is a view similar to FIG. 7, illustrating a modified finishing stage.

FIG. 8 shows a similar arrangement wherein, however, the covering material 19' placed on the web surfaces consists of fiber layers, the fibers being blown through conduits **24*a*, 24*b* onto the surfaces of continuously rotating drums 25*a*, 25*b* heated by radiators 22*a* and 22*b***.

Figure 9:
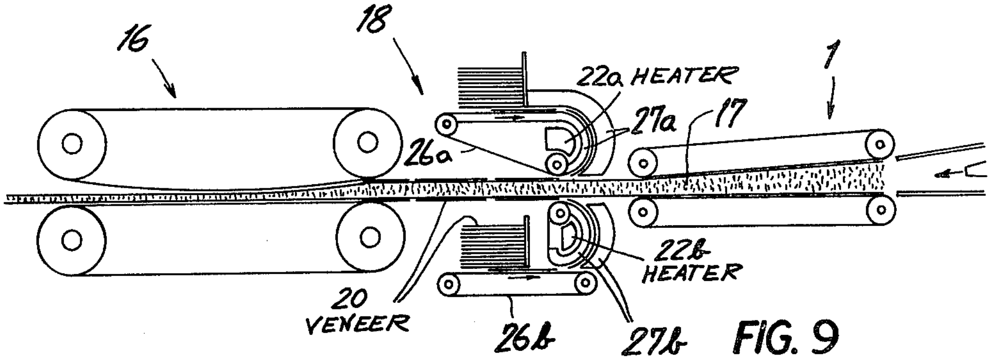
FIG. 9 is another view similar to FIG. 7, illustrating a further modification of the finishing stage.

As shown in FIG. 9, stage 18 comprises a pair of endless upper and lower conveyors **26*a*, 26*b* whose upper runs are loaded with stacks of veneers 20 delivered, one by one, to the two web surfaces along curved guide plates 27*a*, 27*b*; devices 22*a* and 22*b* confront these guide plates so that the veneers 20** are preheated on passing between these radiators and the guide plates.

Naturally, various types of heating means may be used for compression stages 1 and 16 as well as for intermediate stage 18.

We claim:

1. In a method of making pressed boards, the steps comprising:

- continuously blowing a mixture of filler particles coated with thermosetting resin into a space between converging perforated conveyor belts and compacting said particles in said space;
- orienting said particles upon their entry into said space by vibrating said belts adjacent an entrance to said space; and
- preheating a carrier gas, used for said blowing, sufficiently to partially cure said resin.

2. A method as defined in claim 1 wherein said mixture is blown generally horizontally into said throat.

3. A method as defined in claim 1 wherein the step of compacting is followed by a separate step of compressing said web to final thickness, further comprising the step of at least maintaining the temperature of said web between the compacting and compressing steps.

4. A method as defined in claim 3, comprising the further step of applying a surface covering to said web between said compacting and compressing steps.

5. A method as defined in claim 4 wherein the maintenance of the web temperature between said compacting and compressing steps is achieved by preheating said surface covering before applying same to the web surface.

* * * * *